Figure 1:
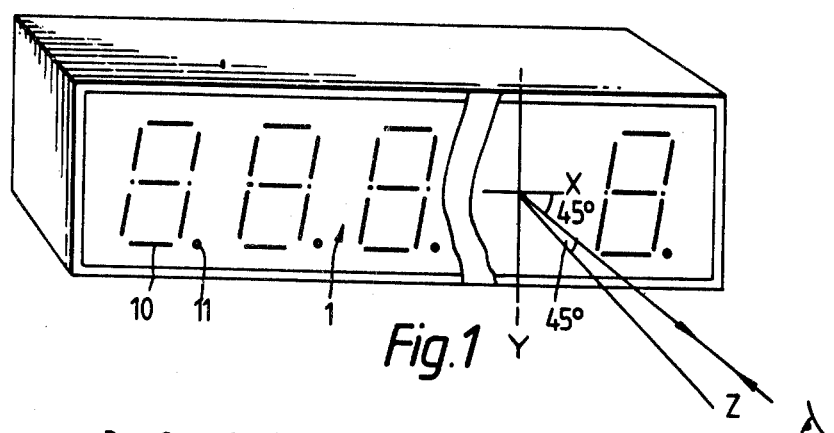

United States Patent [19]

Irving et al.

[11] Patent Number: 4,483,595

[45] Date of Patent: Nov. 20, 1984

[54] LIQUID CRYSTAL COMPOSITIONS

[75] Inventors: Deborah A. L. Irving; Damien G. McDonnell; Edward P. Raynes, all of Malvern, England

[73] Assignee: The Secretary of State for Defence in Her Brittanic Majesty's Government of the United Kingdom of Great Britain and Northern Ireland, London, England

[21] Appl. No.: 354,640

[22] Filed: Mar. 4, 1982

[30] Foreign Application Priority Data

Mar. 13, 1981 [GB] United Kingdom ............... 8108038

[51] Int. Cl.³ .......................... G02F 1/13; C09K 3/34
[52] U.S. Cl. .............................. 350/350 R; 252/299.5; 252/299.62; 252/299.63; 350/336
[58] Field of Search ........... 252/299.5, 299.62, 299.63, 252/299.67; 350/336, 350 R

[56] References Cited

U.S. PATENT DOCUMENTS

| 4,113,647 | 9/1978 | Coates et al. | 252/299.62 |
| 4,130,502 | 12/1978 | Eidenschink et al. | 252/299.63 |
| 4,137,192 | 1/1979 | Matsufuji | 252/299.5 |
| 4,154,697 | 5/1979 | Eidenschink et al. | 252/299.63 |
| 4,198,130 | 4/1980 | Boller et al. | 252/299.5 |
| 4,229,315 | 10/1980 | Krause et al. | 252/299.63 |
| 4,285,829 | 8/1981 | Eidenschink et al. | 252/299.63 |
| 4,309,304 | 1/1982 | Harrison et al. | 252/299.63 |
| 4,330,426 | 5/1982 | Eidenschink et al. | 252/299.63 |
| 4,331,552 | 5/1982 | Eidenschink et al. | 252/299.63 |
| 4,349,452 | 9/1982 | Osman et al. | 252/299.63 |

FOREIGN PATENT DOCUMENTS

| 2854310 | 6/1979 | Fed. Rep. of Germany | 252/299.63 |
| 3023989 | 1/1982 | Fed. Rep. of Germany | 252/299.63 |
|  |  | Germany | 252/299.63 |
| 54-5886 | 1/1978 | Japan | 252/299.63 |
| 54101784 | 8/1979 | Japan | 252/299.63 |
| 5499785 | 8/1979 | Japan | 252/299.63 |
| 54-121286 | 9/1979 | Japan | 252/299.63 |
| 56-2370 | 1/1981 | Japan | 252/299.63 |
| 56-2381 | 1/1981 | Japan | 252/299.61 |
| 2017742 | 10/1979 | United Kingdom | 252/299.63 |
| 2031010 | 4/1980 | United Kingdom | 252/299.63 |
| 2080820 | 2/1982 | United Kingdom | 252/299.63 |

Primary Examiner—Teddy S. Gron
Attorney, Agent, or Firm—Stevens, Davis, Miller & Mosher

[57] ABSTRACT

A nematic liquid crystal composition suitable for use as the liquid crystal material of a multiplexed twisted nematic electro-optical display comprising a mixture of Components A, B and C as follows:

Component A: a high dielectric anisotropy component;
Component B: a low dielectric anisotropy component;
Component C: a high cleaning component having a clearing point greater than 80° C.;

wherein Component A forms from 25% to 50% inclusive by weight of the composition and consists of one or more two ringed compounds having a terminal cyano group and includes at least one compound having formula I as follows

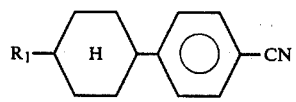

Formula I where $R_1$ is an n-alkyl group having up to 7 carbon atoms and

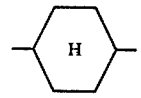

represents a trans-1,4 disubstituted cyclohexane ring; wherein Component B forms from 25% to 50% inclusive by weight of the composition and consists of one or more low dielectric anisotropy compounds, at least 50% of Component B being formed by one or more ester compounds having Formula II as follows:

(Abstract continued on next page.)

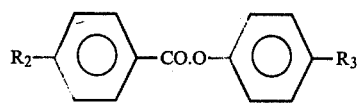 Formula II

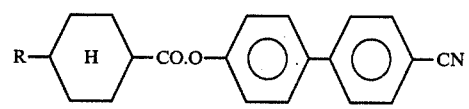 Formula VI

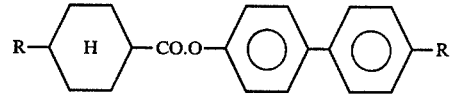 Formula VII

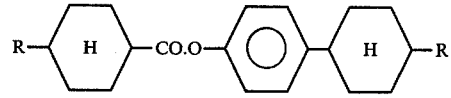 Formula VIII where $R_2$ and $R_3$ are independently n-alkyl groups having up to seven carbon atoms; and wherein Component C forms from 15% to 35% inclusive by weight of the composition and consists of compounds having a clearing point greater than 80° C. and at least 50% by weight of component C is formed by one or more compounds selected from the families whose general formulae are represented by Formulae IV to VII as follows:

where each R is independently n-alkyl having up to seven carbon atoms and

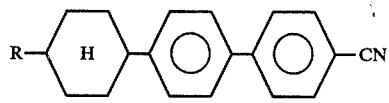 Formula IV

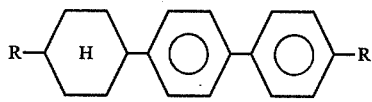 Formula V

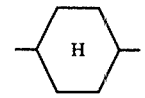

represents a trans-1,4-disubstituted cyclohexane ring; the percentages by weight of Components A, B and C adding to 100%.

17 Claims, 7 Drawing Figures

LIQUID CRYSTAL COMPOSITIONS

This invention relates to liquid crystal materials suitable for use in twisted nematic displays and to twisted nematic displays incorporating such materials.

Liquid crystal devices are commonly formed by sandwiching a layer typically 7 to 12 μm thick, of a liquid crystal material between optically transparent electrically insulating substrates, e.g. glass slides. Electrode structures on the substrates enable voltages to be applied across the layer and change the molecular arrangement of the liquid crystal molecules in selected regions. This causes an observable effect in those regions which can be used in displays of various types, for example, digital watches, small calculators, voltage meters, etc.

There are several different display effects which may be obtained from electrical re-arrangement of liquid crystal molecules. These depend on the liquid crystal material employed and the initial molecular alignment (if any). This invention is concerned particularly with the twisted nematic effect in which an essentially nematic material is arranged in its OFF state (zero or low applied voltage) in an arrangement in which the molecules gradually twist, usually through 90°, from one substrate surface to the other as defined by fixed alignments at these surfaces. Such an arrangement is optically active, i.e. rotates the plane of polarized light in this state. An applied voltage greater than a threshold essentially causes the twist to be destroyed so that the molecular arrangement is no longer optically active. Thus, when placed between plane (linear) polarizers a twisted nematic effect device provides one or more optical shutters which are switchable from a light state to a dark state or vice versa depending on whether the polarizers are in a parallel or cross relationship.

Such shutters may in a single device form the component elements of a series of letters, words or numerals, i.e. in an information display, as defined by the electrode structures on the substrates and the applied voltages. An example of a twisted nematic effect device is further described in UK Pat. No. 1,478,592.

Conventionally, liquid crystal materials used in twisted nematic displays are basically nematic mixtures of compounds having a high positive dielectric anisotropy $\Delta\epsilon$, e.g. $|\Delta\epsilon| > +3$. The dielectric anisotropy is the difference between the average dielectric constant measured parallel ($\epsilon_\parallel$) to the molecules and the average dielectric constant ($\epsilon_\perp$) measured perpendicular to the molecules when aligned together. The individual compounds in the mixture are normally compounds containing a terminal cyano group in the p-position of a benzene ring. They are also nematogenic, which means that they show nematic liquid crystal properties or tendencies and exhibit a nematic liquid crystal phase when formed into a mixture together with other nematogenic compounds.

For example mixtures of cyanobiphenyls and terphenyls as described in UK Pat. No. 1,433,130 have found wide use in twisted nematic displays and give an excellent range of properties for many purposes in such displays. One example of such a mixture is the well known material E7 marketed by BDH Chemicals Ltd of Broom Road, Poole, Dorset, England.

One problem with which the present invention is concerned relates to the temperature dependence of operation of a twisted nematic liquid crystal display. If such a display is designed for optimum performance at a given value of temperature, e.g. 20° C., it is clearly desirable that the performance should vary as little as possible if the ambient temperature varies from that given value. The temperature dependence of operation may be designated as $1/V_x (\Delta V/\Delta T)$ where V is the voltage required to achieve the ON state and $\Delta V$ is the change in the voltage V caused by a change in temperature $\Delta T$. The value of this parameter is determined primarily by the liquid crystal material used in the display.

As noted above, cyanobiphenyls and cyanoterphenyls have found wide use particularly in twisted nematic effect displays. However, mixtures of these materials give typical values of from 0.8 to b 0.9% per C° over the temperature range 0° to 40° C. in twisted nematic displays and this is considered to be rather high.

Another problem with which the present invention is concerned relates to the multiplexibility of a twisted nematic display. Multiplexing involves applying electric potentials to lines of electrodes connected in series, each region or display element, e.g. each individual shutter in a twisted nematic effect display, being defined by the intersection of the electrodes on the two substrates. Examples of multiplexed displays are the matrix displays described in UK Pat. No. 1,458,045.

In multiplexed displays all electrodes in the display receive a non-zero electrical potential, even when they are in the OFFstate. Consequently it is difficult to provide sufficient contrast between the ON and OFF states. The contrast can vary with viewing angle, temperature and liquid crystal material as well as applied voltage. As described in UK Patent Application No. 2030100A a figure of merit which may be used to define multiplexibility, i.e. the usefulness of any given material in a multiplexed twisted nematic effect display is the parameter $M_{20}$. This is the ratio, at 20° C., of voltages $V_{10}(0°): V_{90}(45°)$ which are voltages which may be designated as necessary to achieve the ON and OFF states respectively. In fact $V_{10}(0°)$ is the minimum voltage required to achieve along an axis normal to the display substrates 10% of the maximum light transmission along that axis for a twisted nematic effect cell: the incident light is plane polarized parallel to the surface alignment of the liquid crystal molecules upon which the light is first incident and the analyzer is arranged with its polarizing axis perpendicular to that alignment and parallel to the surface alignment of the molecules from which the light emerges.

$V_{90}(45°)$ is the maximum voltage which gives along an axis at a viewing angle of 45° to the alignment directions on the substrate surfaces 90% of the maximum transmission along that direction for the same cell for which $V_{10}(0°)$ is measured. Of the four possible directions which are at 45° to the alignment directions the direction having the lowest value of $V_{90}(45°)$ An ideal material would have $M_{20}$ equal or just greater than unity so that a very small change in applied voltage could be used to switch between the OFF and ON states. In practice, other liquid crystal properties, e.g. the temperature range of the nematic mesophase, have to be taken into account as well.

Although cyanobiphenyls, e.g. mixed together with a cyano-p-terphenyl, have found wide use in twisted nematic displays in general it is not easy to achieve multiplexing with them. For example the material E7 mentioned above has a value of 1.81 for $M_{20}$ which is considered to to be low enough.

In UK published Patent application No. 2031010A it is described how $M_{20}$ may be reduced by mixing cyanobiphenyls together with benzoate esters. However the mixtures formed have certan properties relevant to multiplexed operation which could preferably be improved. For example, such mixtures do not have particularly low values of $1/V$ ($\Delta V/\Delta T$) in the cases where the better values of $M_{20}$ (which is desirably as low as possible) are obtained. In such cases $1/V$ ($\Delta V/\Delta T$) is typically 0.6% per C° (compared to 0.85% per C° for E7).

Reduced temperature dependence of operation may be achieved by substituting esters of the form $R_1$—$Z_1$—COO—$Z_2$—$R_2$ for the benzoate esters, $Z_1$ being a trans-4,4'-disubstituted cyclohexane or 4,4'di-substituted bicyclo (2,2,2) octane ring and $Z_2$ being an optionally fluoro-substituted benzene ring. However such alternative esters are generally less stable (chemically and photochemically) than the benzoate esters.

It is the purpose of this invention to provide a liquid crystal material for multiplexed twisted nematic displays having an improvement in one or more of its properties relevant to such use, particularly reduced temperature dependence of operation, i.e. lowr values of $1/V$ ($\Delta V/\Delta T$) in multiplexed twisted nematic displays without sacrificing chemical or photochemical stability.

According to the present invention a nematic liquid crystal composition suitable for use as the liquid crystal material of a multiplexed twisted nematic electro-optical display comprises a mixture of Components A, B and C as follows:

Component A: a high positive dielectric anisotropy, low melting component having a melting point less than 20° C.;
Component B: a low dielectric anisotropy component;
Component C: a high clearing component having a clearing point greater than 80° C.;
wherein Component A forms from 25% to 50% inclusive by weight of the composition and consists of one or more two ringed compounds having a terminal cyano group and includes at least one compound having Formula I as follows:

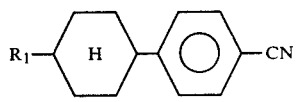

Formula I where $R_1$ is an n-alkyl group having up to 7 carbon atoms and

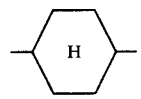

represents a trans-1,4 disubstituted cyclohexane ring;
wherein Component B forms from 25% to 50% by weight inclusive of the composition and consists of one or more low dielectric anisotropy compounds, at least 50% of Component B being formed by one or more ester compounds having Formula II as follows:

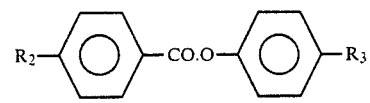

Formula II where $R_2$ and $R_3$ are independently n-alkyl groups having up to 7 carbon atoms, and wherein Component C forms from 15% to 35% by weight inclusive of the composition and consists of compounds having a clearing point greater than 80° C. and at least 50% by weight of Component C is formed by one or more compounds selected from the families whose general formulae are represented by Formula IV or VII as follows:

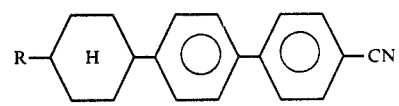

Formula IV

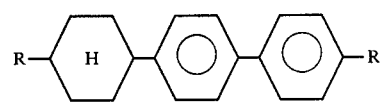

Formula V

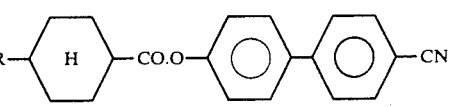

Formula VI

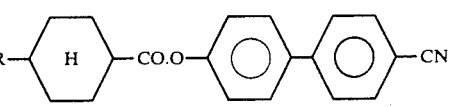

Formula VII

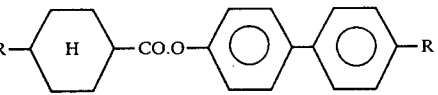

Formula VIII

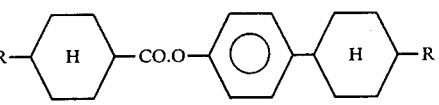

where each R is independently n-alkyl having up to 7 carbon atoms and

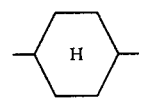

represents a trans-1,4-disubstituted cyclohexane ring; the percentages by weight of Components A, B and C adding to 100%.

By 'high positive dielectric anisotropyl' is meant a positive dielectric anisotropy magnitude greater than 3.
By 'low dielectric anisotropy' is meant a dielectric anisotropy (positive or negative) magnitude less than 2.
Preferably, the one or more components of Formula I form at least 40% by weight of Component A.
The high clearing point compounds of Formulaw IV to VIII may form 100% of Component C.
Component B may, in addition to the ester compounds of Formula II, include one or more compounds selected from the families whose general formulae are represented by Formulae VIII to XVII as follows:

Formula IX

R'—◯—◯—R'

Formula X

R—H—◯—R'

Formula XI

R—H—CO.O—◯—R'

Formula XII

R—H—CO.O—◯—R
            |
            F

Formula XIII

R—◯—CO.O—◯—R
            |
            F

Formula XIV

R—▱—CO.O—◯—R'

Formula XV

R—▱—CO.O—◯—R
            |
            F

Formula XVI

R—H—◯—CO.OR

Formula XVII

R''—◯—CO.O—◯—R'

Formula XVIII

R—◯—CO.O—◯—R'' where each R is independently n-alkyl having up to 7 carbon atoms, each R' is independently n-alkyl or n-alkoxy having up to 7 carbon atoms, and each R'' is independently n-alkoxy having up to 7 carbon atoms,

—⬡H— represents a trans-1,4-disubstituted cyclohexane ring and

▱ represents a bicyclo (2,2,2) octane ring.

Preferably at least 80% by weight of Component B consists of ester compounds. The ester compounds of formula II may in fact form 100% of Component B.

If Component A is not formed entirely of one or more compounds of Formula I it is preferably formed of one or more cyanobiphenyl compounds together with the one or more compounds of Formula I, the cyanobiphenyl(s) being of Formula III as follows:

Formula III

R—◯—◯—CN where R is an n-alkyl group having up to 7 carbon atoms.

One example of a class of compositions embodying the present invention is one which includes:
(i) one or more compounds of Formula I forming from 35% to 45% inclusive by weight of the composition;
(ii) one or more compounds of Formula II forming from 35% to 45% inclusive by weight of the composition;
(iii) one or more compounds selected from Formulae IV to VIII forming from 15% to 30% inclusive by weight of the composition.

Another example of a class of compositions embodying the present invention, which includes both compounds of Formula I and Formula III, is one which includes:
(i) one or more compounds of formula I as specified in claim 1 forming from 10% to 30% inclusive by weight of the composition;
(ii) one or more 4-n-alkyl-4'-cyanobiphenyls having up to 7 carbon atoms in the n-alkyl group forming from 10% to 30% inclusive by weight of the composition;
(iii) one or more compounds of Formula II as specified in claim 1 forming from 20% to 50%, preferably from 35% to 45% inclusive by weight of the composition;
(iv) one or more compounds of Formulae IV to VIII specified in claim 1 forming from 15% to 35% inclusive by weight of the composition.

Preferably, the one or more compounds of Formula I include either:

$C_2H_5$—H—◯—CN and/or $n\text{-}C_4H_9$—H—◯—CN.

Preferably, the esters of Formula II have an odd number of carbon atoms in their n-alkyl groups.

Component C may include one or more other high clearing point compounds selected from:

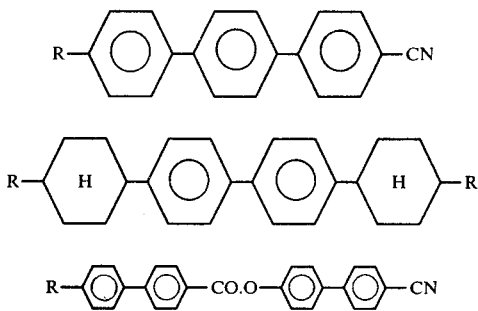

where each R is independently n-alkyl having up to 7 carbon atoms.

For application to a twisted nematic effect device the composition according to the present invention may be mixed together with a chiral additive normally forming not more than 1.5% by weight of the overall mixture. Optically active 4-alkyl-or-alkoxy-4'-cyanobiphenyls are preferred as chiral additives. Such additives are well known in the art to avoid display patchiness arising from reverse molecular twists.

By specially formulating compositions in accordance with the present invention examples of liquid crystal materials may be formed which show relatively low values of $1/V$ ($\Delta V/\Delta T$), e.g. less than 0.4% per C°, in cases where the values obtained for $M_{20}$ and $V_{90}(45°)$ are comparable with the best values obtained for the materials described in UK Patent application No. 2031010A.

Although the values of $1/V$ ($\Delta V/\Delta T$) are not improved in very case according to the present invention, particularly if no cyanobiphenyl material is present, nevertheless other properties, such as viscosity, which determines display switching speed, and birefringence, which determines angular viewing properties, are improved compared to the properties of known mixtures of cyanobiphenyls and benzoate esters.

According to the present invention in a second aspect a liquid crystal electro-optical display includes two dielectric substrates at least one of which is transparent, a film of liquid crystal material sandwiched between the substrates the molecular arrangement in the material being such as to give the twisted nematic effect, and electrodes on the inner surfaces of the substrates for applying electric fields across the liquid crystal material, characterised in that the material is as defined in the first aspect above.

Figure 2:
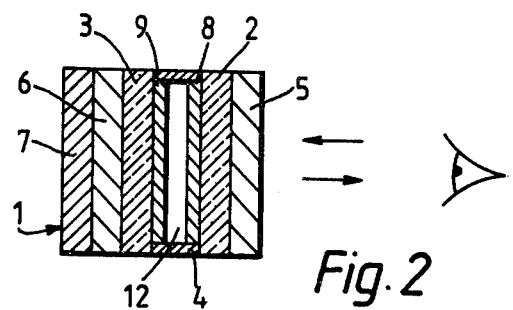
Figure 3:
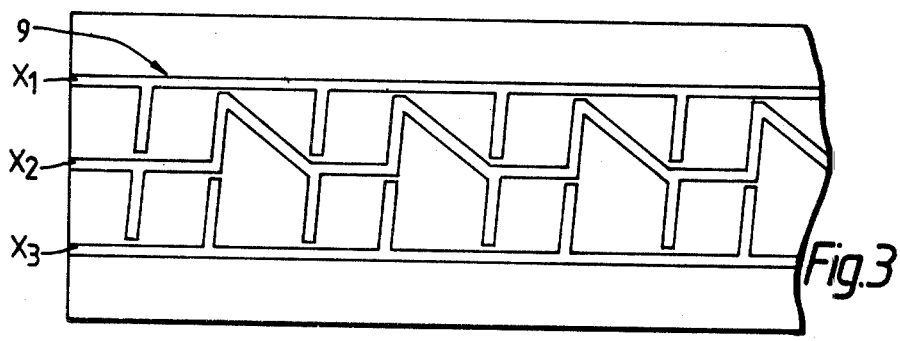
Figure 4:
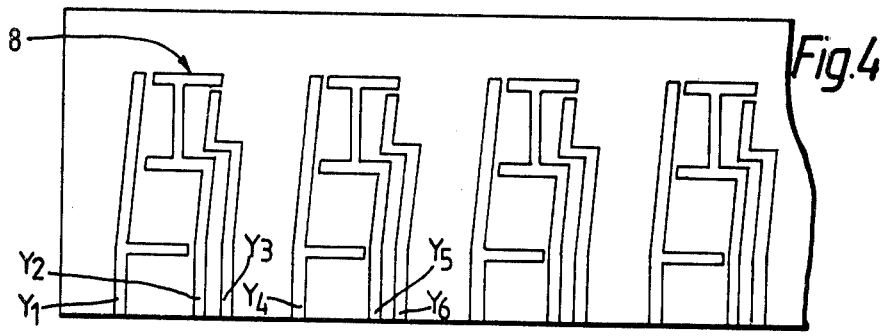
Figure 5:
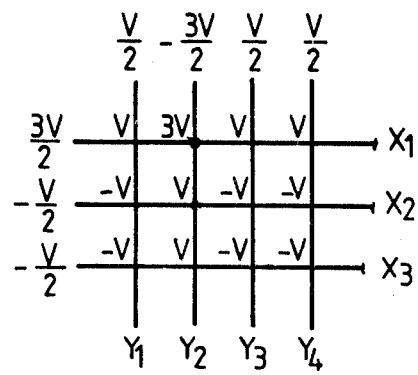
Figure 6:
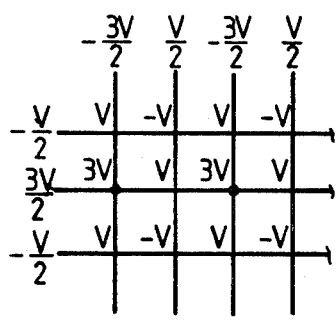
Figure 7:
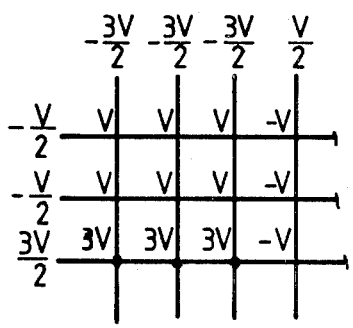

Examples of devices and materials embodying the invention will now be described by way of example only with reference to the accompanying drawings wherein:

FIG. 1 is a sectional view of a digital display;
FIG. 2 is a sectional view of FIG. 1;
FIG. 3 shows a rear electrode configuration for FIG. 1;
FIG. 4 shows a front electrode configuration for FIG. 1;
FIGS. 5, 6, 7 show schematic views of the device of FIGS. 1 to 4 with typical addressing voltages.

The display of FIGS. 1 to 4 comprises a cell 1, formed of two, front and back, glass slides 2, 3 respectively, spaced 7 μm apart by a spacer 4 all held together by an epoxy resin glue. In front of the front glass slide 2 is a front polarizer 5 arranged with its axis of polarization axis horizontal. A reflector 7 is arranged behind a back polarizer 6 behind the slide 3.

Electrodes 8, 9 of tin oxide typically 100Å thick are deposited on the inner faces of the slides 2, 3 as a complete layer and etched to the shapes shown in FIGS. 3, 4. The display has seven bars per digit 10 plus a decimal point 11 between each digit. As shown in FIG. 3 the rear electrode structure is formed into three electrodes $x_1$, $x_2$, $x_3$. Similarly the front electrode structure is formed into three electrodes per digit and decimal point $y_1$, $y_2$, $y_3$. . . Examinations of the six electrodes per digit shows that each of the eight elements can independently have a voltage applied thereto by application of suitable voltage to appropriate x, y electrodes.

Prior to assembly the electrode clear slides 2, 3 are cleaned then dipped in a solution of 0.2% by weight of poly vinyl alcohol (PVA) in water. When dry, the slides are rubbed in a single direction with a soft tissue then assembled with the rubbing direction orthoganl to one another and parallel to the optical axis of the respective adjacent polarizers. When a nematic liquid crystal material 12 is introduced between the slides 2, 3 the molecules at the slide surfaces lie along the respective rubbing directions with a progessive 90° twist between the slides.

When zero voltage is applied to the cell 1 light passes through the front polarizer 5, through the cell 1 (whilst having its plane of polarization rotated 90°) through its rear polarizer 6 to the reflector 7 where it is reflected back again to an observer, (shown at an angle of 45° to the axis Z normal to axes X and Y in the plane of the slides 2, 3). When a voltage above a threshold value is applied between the electrode 8, 9 the liquid crystal layer 12 loses its rotary power, or optical activity, the molecules being re-arranged to lie perpendicular to the slides 2, 3, i.e. along the axis Z. Thus light at that position does not reach the reflector 7 and does not reflect back to the observer who sees a dark display of one or more bars of a digit 10.

Voltages are applied as follows as shown in FIGS. 5, 6 and 7 fro three successive time intervals. An electric potential of $3V/2$ is scanned down each x electrode in the whilst $-V/2$ is applied to the remaining x electrodes. Meanwhile $-3V/2$ or $V/2$ is applied to the y electrodes. A coincidence of $3V/2$ and $-3V/2$ at an intersection results in a voltage 3 V across the liquid crystal layer 12. Elsewhere the voltage is V or $-V$. Thus by applying $-3V/2$ to appropriate y electrodes as $3V/2$ is scanned down the x electrode selected intersections are turned ON as indicated by solid circles. The electric voltage V is an ac signal of e.g. 100 Hz square wave, and the sign indicates the phase.

Each OFF intersection receives V for the entire scan period whilst each ON intersection receives 3 V for one third of the scan period and V for the rest of the scan period making an rms value of 1.91 V. Thus the material of layer 12 preferably has $M_{20}$ less than 1.91 to give a reasonable contrast between the ON and OFF states.

For similar displays having more than three rows of electrodes the figure of 1.91 V is reduced accordingly. This illustrates the importance of the parameter $M_{20}$.

Suitable nematic mixtures for use to form the layer 12 in the above device are described below.

Small amounts of the cholesteric material may be added to the nematic material to induce a preferred twist in the molecules in the liquid crystal layer. This and the use of appropriate slide surface treatment removes the problems of display patchiness as taught in U.K. Pat. No. 1,472,247 and No. 1,478,592.

C 15 about 0.1 to 0.5% by weight and CB 15 about 0.01 to 0.05% by weight.

C 15 is CH$_3$.CH$_2$CH(CH$_3$)CH$_2$O— 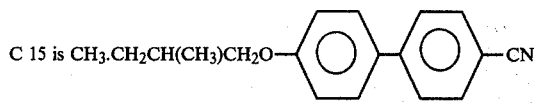 —CN

CB 15 is CH$_3$CH$_2$CH(CH$_3$)CH$_2$— 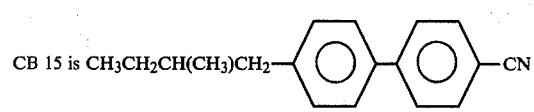 —CN

The following mixtures are examples of nematic materials embodying the invention which may be used in the above device. In the properties of the mixtures:

$M_{20}$ is as defined above;
$M'_{20}$ is a similarly measured ratio but is the voltage required to give 50% transmission at an angle of 10° to the normal to the twisted nematic cell divided by the voltage $$V_{90}(45°); \text{ ie } M'_{20} = \frac{50(10°)}{V_{90}(45°)}$$

this is another figure of merit for the multiplexibility of a material in twisted nematic operation; a typical value for a mixture of cyanobiphenyls alone is 1.36 (for the material E7).

$1/V (\Delta V/\Delta T)$ is as defined above;
N-I represents nematic liquid crystal to isotropic liquid transition temperature;
$\Delta n$ represents birefringence measured at 20° C. and 589 nm;
t represents the average thickness of the liquid crystal layer (separation of the substrates) for a twisted nematic cell;
Margin (1:3) is the parameter $$\frac{1.92 - A}{1.92 + A} \times 100(\%)$$

where $$A = \frac{V_{50}(10°) \text{ at } 0° \text{ C.}}{V_{90}(45°) \text{ at } 40° \text{ C.}}$$

This term is explained further below.
$V_{Th} = V_{90}(45°)$ (as defined above) at 20° C.

Ratio (1:2) is the ratio of the amount by weight of the first component present to the amount by weight of the second component present, the first and second components being two ringed cyano compounds and benzoate esters respectively.

EXAMPLE 1

| Mixture 1 | |
|---|---|
| Components | Weight % |
| C$_2$H$_5$—⟨H⟩—⟨O⟩—CN | 15 |
| n-C$_4$H$_9$—⟨H⟩—⟨O⟩—CN | 25 |

-continued

| Mixture 1 | |
|---|---|
| n-C$_3$H$_7$—⟨O⟩—COO—⟨O⟩—C$_5$H$_{11}$—n | 40 |
| n-C$_5$H$_{11}$—⟨H⟩—⟨O⟩—CN | 10 |
| C$_2$H$_5$—⟨H⟩—COO—⟨O⟩—⟨O⟩—CN | 10 |

Ratio (1:2) for Mixture 1 = 50:50
Properties of Mixture 1 for t = 10 μm
- N-I (°C.) = 54
- $\Delta n$ = 0.13
- $V_{Th}$ = 1.02 V
- $M_{20}$ = 1.78
- $M'_{20}$ = 1.36
- $1/V (\Delta V/\Delta T)$ (% per C.°) = 0.58
- Margin 1:3 (%) = 4.4

EXAMPLE 2

| Mixture 2 | |
|---|---|
| Component | Weight % |
| C$_2$H$_5$—⟨H⟩—⟨O⟩—CN | 15 |
| n-C$_4$H$_9$—⟨H⟩—⟨O⟩—CN | 25 |
| n-C$_3$H$_7$—⟨O⟩—COO—⟨O⟩—C$_7$H$_{15}$—n | 40 |
| n-C$_5$H$_{11}$—⟨H⟩—⟨O⟩—⟨O⟩—C$_2$H$_5$ | 20 |

Ratio 1:2 for Mixture 2 = 50:50
Properties of Mixture 2 for t = 10 μm
- N-I (°C.) = 45
- $\Delta n$ = 0.11
- $V_{Th}$ = 1.17 V
- $M_{20}$ = 1.70
- $M'_{20}$ = 1.21
- $1/V (\Delta V/\Delta T)$ (% per C.°) = 0.65
- Margin 1:3 (%) = 8.6

EXAMPLE 3

| Mixture 3 | |
|---|---|
| Component | Weight % |
| C$_2$H$_5$—⟨H⟩—⟨O⟩—CN | 15 |
| n-C$_4$H$_9$—⟨H⟩—⟨O⟩—CN | 25 |
| n-C$_7$H$_{15}$—⟨O⟩—COO—⟨O⟩—C$_3$H$_7$—n | 40 |
| n-C$_5$H$_{11}$—⟨H⟩—⟨O⟩—⟨O⟩—CN | 10 |

Mixture 3 -continued

| Component | Weight % |
|---|---|
| $C_2H_5$—(H)—COO—⌬—⌬—CN | 10 |

Ratio 1:2 for Mixture 3 = 50:50
Properties of Mixture 3 for t = 11 μm:
- N-I = 56
- Δn = 0.13
- $V_{Th}$ = 1.09 V
- M20 = 1.83
- M'20 = 1.37
- 1/V (ΔV/ΔT) (% per C.°) = 0.55
- Margin 1:3 (%) = 4.0

EXAMPLE 4

Mixture 4

| Component | Weight % |
|---|---|
| n-$C_3H_7$—(H)—⌬—CN | 15 |
| n-$C_5H_{11}$—(H)—⌬—CN | 25 |
| n-$C_3H_7$—⌬—COO—⌬—$C_5H_{11}$-n | 40 |
| n-$C_5H_{11}$—(H)—⌬—⌬—CN | 10 |
| $C_2H_5$—(H)—COO—⌬—⌬—CN | 10 |

Ratio (1:2) for Mixture 4 = 50:50
Properties of Mixture 4 for t = 12 μm:
- N-I (°C.) = 67
- Δn = 0.14
- $V_{Th}$ = 1.21 V
- M20 = 1.85
- M'20 = 1.38
- 1/V (ΔV/ΔT)(% per C.°) = 0.50
- Margin 1:3 (%) = 6.7

EXAMPLE 5

Mixture 5

| Component | Weight % |
|---|---|
| $C_2H_5$—⌬—⌬—CN | 15 |
| n-$C_4H_9$—⌬—⌬—CN | 3 |
| n-$C_4H_9$—(H)—⌬—CN | 20 |
| n-$C_3H_7$—⌬—COO—⌬—$C_5H_{11}$-n | 40 |
| $C_2H_5$—(H)—COO—⌬—⌬—CN | 11 |

Mixture 5 -continued

| Component | Weight % |
|---|---|
| n-$C_5H_{11}$—(H)—⌬—⌬—CN | 11 |

Ratio (1:2) for Mixture 5 = 47:53
Properties of Mixture 5 for t = 6.0 μm:
- N-I (°C.) = 61
- Δn = 0.15
- Viscosity
  - at 20° C. = 40 cps
  - at 0° C. = 154 cps
- $V_{Th}$ = 1.02 V
- M20 = 1.75
- M'20 = 1.32
- 1/V (ΔV/ΔT)(% per C.°) = 0.44
- Margin 1:3 (%) = 8.5

EXAMPLE 6

Mixture 6

| Component | Weight % |
|---|---|
| $C_2H_5$—⌬—⌬—CN | 15 |
| n-$C_4H_9$—(H)—⌬—CN | 15 |
| n-$C_3H_7$—⌬—COO—⌬—$C_5H_{11}$-n | 40 |
| $C_2H_5$—(H)—COO—⌬—⌬—CN | 15 |
| n-$C_5H_{11}$—(H)—⌬—⌬—CN | 15 |

Ratio (1:2) for Mixture 6 = 43:57
Properties of Mixture 6 for t = 7 μm:
- N-I (°C.) = 78
- Δn = 0.17
- Viscosity
  - at 20° C. = 44 cps
  - at 0° C. = 178 cps
- $V_{Th}$ = 1.16 V
- M20 = 1.74
- M'20 = 1.34
- 1/V (ΔV/ΔT)(% per C.°) = 0.38
- Margin 1:3 (%) = 10

EXAMPLE 7

Mixture 7

| Component | Weight % |
|---|---|
| $C_2H_5$—⌬—⌬—CN | 15 |
| n-$C_4H_9$—⌬—⌬—CN | 3 |
| n-$C_4H_9$—(H)—⌬—CN | 20 |
| n-$C_3H_7$—⌬—COO—⌬—$C_5H_{11}$-n | 30 |

-continued

| Mixture 7 | |
|---|---|
| n-C$_5$H$_{11}$—⟨H⟩—◯—◯—CN | 16 |
| C$_2$H$_5$—⟨H⟩—COO—◯—◯—CN | 16 |

Ratio (1:2) for Mixture 7 = 56:44
Properties of Mixture 7

| | N-I (°C.) | = 83 |
|---|---|---|
| | Δn | = 0.17 |
| | Viscosity | |
| | at 20° C. | = 48 cps |
| | at 0° C. | = 192 cps |
| for | V$_{Th}$ | = 1.11 V |
| t = | M$_{20}$ | = 1.76 |
| 7 μm | M'$_{20}$ | = 1.36 |
| | 1/V (ΔV/ΔT)(% per C.°) | = 0.36 |
| | Margin 1:3 (%) | = 9.1 |

EXAMPLE 8

| Mixture 8 | |
|---|---|
| Component | Weight % |
| C$_2$H$_5$—◯—◯—CN | 15 |
| n-C$_4$H$_9$—◯—◯—CN | 15 |
| n-C$_4$H$_9$—⟨H⟩—◯—CN | 20 |
| n-C$_3$H$_7$—◯—COO—◯—C$_5$H$_{11}$-n | 20 |
| n-C$_3$H$_7$—⟨H⟩—COO—◯—◯—C$_5$H$_{11}$-n | 20 |
| C$_2$H$_5$—⟨H⟩—COO—◯—◯—CN | 10 |

Ratio (1:2) for Mixture 8 = 71:29
Properties of Mixture 8

| | N-I (°C.) | = 72 |
|---|---|---|
| | Δn | = 0.145 |
| | Viscosity | |
| | at 20° C. | = 36 cps |
| for | V$_{Th}$ | = 1.12 V |
| t = | M$_{20}$ | = 1.82 |
| 10 μm | M'$_{20}$ | = 1.35 |
| | 1/V (ΔV/ΔT)(% per C.°) | = 0.45 |
| | Margin 1:3 (%) | = 8.3 |

EXAMPLE 9

Mixture 9
The same as Mixture 8 1 but with

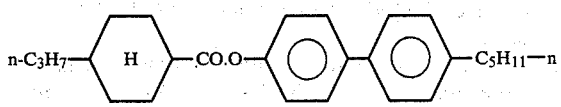

replaced by

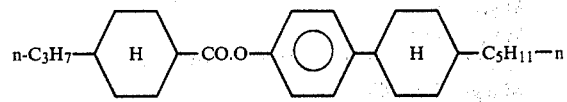

(the components being in the same proportions by weight as in Mixture 8).

| Mixture 9 | |
|---|---|
| Component | Weight % |
| C$_2$H$_5$—◯—◯—CN | 15 |
| n-C$_4$H$_9$—⟨H⟩—◯—CN | 15 |
| n-C$_3$H$_7$—◯—COO—◯—C$_3$H$_7$-n | 40 |
| n-C$_5$H$_{11}$—⟨H⟩—◯—◯—CN | 15 |
| C$_2$H$_5$—⟨H⟩—COO—◯—◯—CN | 15 |

Ratio (1:2) for Mixture 9 = 43:57
Properties of Mixture 9

| | N-I (°C.) | = 75 |
|---|---|---|
| | V$_{Th}$ | = 1.11 V |
| for | M$_{20}$ | = 1.73 |
| t = | 1/V (ΔV/ΔT)(% per C.°) | = 0.34 |
| 7 μm | M'$_{20}$ | = 1.33 |
| | Margin 1:3 (%) | = 11.0 |

EXAMPLE 10

| MIXTURE 10 | |
|---|---|
| Component | Weight % |
| C$_2$H$_5$—◯—◯—CN | 15 |
| n-C$_4$H$_9$—◯—◯—CN | 6 |
| n-C$_3$H$_7$—⟨H⟩—◯—CN | 23 |
| n-C$_3$H$_7$—◯—COO—◯—C$_3$H$_7$-n | 30 |
| n-C$_5$H$_{11}$—⟨H⟩—◯—◯—CN | 13 |
| C$_2$H$_5$—⟨H⟩—COO—◯—◯—CN | 13 |

Mixture 10 has the following properties in a twisted nematic cell having a liquid crystal material thickness of 7 μm.
Melting point = −10° C.
N-I = 69° C.
Δ = 0.164 at 20° C.

$V_{90}(45°)$ at 20° C. = 1.01 volts
$M_{20} = 1.8$
$M^1_{20} = 1.36$
$1/V(\Delta V/\Delta T)$ 0° C.→40° C. = 0.42% per C.°
Margin 1:3 = 8%

For a particular number of lines to be addressed, a particular matrix (multiplexing) addressing selection scheme is chosen which determines a fixed voltage discrimination ratio ($V_{on}/V_{off}$), supplied by the addressing and drive electronics of the display.

A given minimum $V_{off}(V_{90}(45°)$ at 40° C.) and maximum $V_{on}(V_{50}(10°)$ at 0° C.) condition exists for the material over a specified temperature range (e.g. 0°–40° C.) under ideal twisted nematic cell conditions.

In practice, variations within the cell construction can cause the discrimination ratio $$\left[ \frac{V_{50}(10°) \text{ at } (10° \text{ C.})}{V_{90}(45°) \text{ at } (40° \text{ C.})} \right]$$

required to drive the material over the whole display to increase from the ideal case. The margin is a measure expressed as a percentage of the maximum amount the discrimination ratios (ie in the ideal and practical cases) can vary relative to one another without a fall off in the optical performance occuring.

The values obtained for $1/V(\Delta V/\Delta T)$ in some of the above Examples, particularly Examples 5–11, which are less than 0.5% per C.°, generally better than the values, typically between 0.5% per C.° and 0.7% per C.° obtained for the known cyanobiphenyl/benzoate ester multiplexing mixtures.

In Examples 1–11 the stated constituent percentages may be varied by up to 10% (relative to the composition) without significantly affecting the nature of the composition.

We claim:

1. A nematic liquid crystal compostion suitable for use as the liquid crystal material of a multiplexed twisted nematic electro-optical display comprising a mixture of Components A, B and C as follows:
   Component A: a high dielectric anisotropy component;
   Component B: a low dielectric anisotropy component;
   Cpmponent C: a high clearing component having a clearing point greater than 80° C.;
   wherein Component A forms from 20% to 60% inclusive by weight of the composition and comprises one or more compounds of formula:

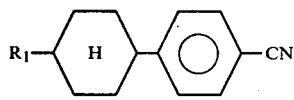
(Formula I)

where $R_1$ is an n-alkyl group having from 2 to 4 carbon atoms; together with one or more compounds of formula:

(Formula III)

where R is an n-alkyl group having from 2 to 4 carbon atoms; provided that 4-cyano-4'-ethylbiphenyl is present in Component A;

wherein Component B forms from 20% to 50% by weight of the composition and comprises one or more esters of formula:

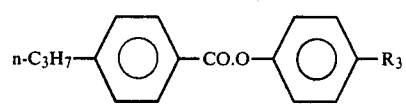
(Formula II)

where $R_3$ is selected from n—$C_3H_{11}$ and n—$C_7H_{15}$;

and wherein Component C forms from 15% to 35% inclusive by weight of the composition and consists of compounds having a clearing point greater than 80° C. and at least 50% by weight of Component C is formed by one or more compounds selected from the families of compounds whose formulae are represented by Formulae IV to VII as follows:

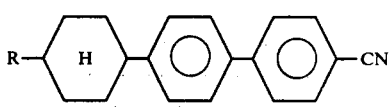
(Formula IV)

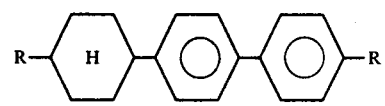
(Formula V)

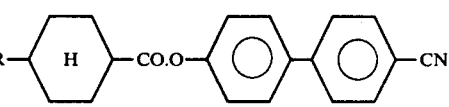
(Formula VI)

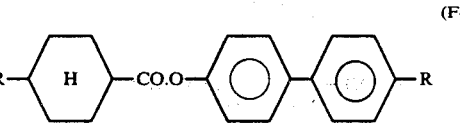
(Formula VII)

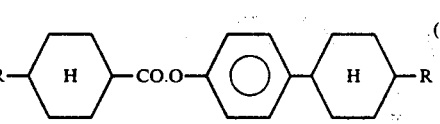
(Formula VIII)

where each R is independently n-alkyl having up to seven carbon atoms, and

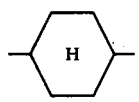

represents a trans-1,4-disubstituted cyclohexane ring;
the percentages by weight of Components A, B and C adding to 100%.

2. A composition as claimed in claim 1 wherein the 4-cyano-4'-ethylbiphenyl forms about 15% by weight of the composition.

3. A composition as claimed in claim 1 wherein the compound trans-1-n-butyl-4-(4'-cyanophenyl)-cyclohexane is present in the composition as a compound of Formula I.

4. A composition as claimed in claim 1 wherein the compound 4-n-propyl(4'-n-pentyl) phenylbenzoate is present in the composition as a compound of Formula II.

5. A composition as claimed in claim 1 and which comprises the following:
   (i) one or more compounds of Formula I as specified in claim 1 and one or more compounds of Formula III together forming from 35% to 45% inclusive by weight of the composition;
   (ii) one or more compounds of Formula II as specified in claim 1 forming from 35% to 45% by weight inclusive of the composition;
   (iii) one or more compounds selected from Formulae IV to VIII as specified in claim 1 forming from 15% to 30% by weight inclusive of the composition.

6. A composition as claimed in claim 1 and wherein up to 1.5% by weight of a chiral additive is added to the composition.

7. A composition as claimed in claim 6 and wherein the chiral additive comprises one more chiral 4-alkyl- or-alkoxy-4'-cyanobiphenyls.

8. A composition as claimed in claim 1 and which comprises the following:
   (i) one or more compounds of Formula I as specified in claim 1 forming from 10% to 30% inclusive by weight of composition;
   (ii) one or more 4-n-alkyl-4'-cyanobiphenyls having up to seven carbon atoms in the n-alkyl group forming from 10% to 30% inclusive by weight of the composition;
   (iii) one or more compounds of Formula II as specified in claim 1 forming from 20% to 50% inclusive by weight of the composition;
   (iv) one or more compounds of Formulae IV to VIII specified in claim 1 forming from 15% to 35% inclusive by weight of the composition.

9. A composition as claimed in claim 1 and wherein the one or more compounds of Formula II form from 35% to 45% inclusive by weight of the composition.

10. A composition as claimed in claim 1 and wherein the one or more compounds of Formula I are one or more compounds selected from trans-1-ethyl-4-(4'-cyanophenyl)cyclohexane and trans-1-n-butyl-4(-4'-cyanophenyl)cyclohexane.

11. A composition as claimed in claim 1 and which comprises the following stated components in the stated percentage by weight or percentages which differ therefrom by not more than 10% of the composition:

| Component | Percentage by weight |
|---|---|
| $C_2H_5$—⟨◯⟩—⟨◯⟩—CN | 15 |
| $n\text{-}C_4H_9$—⟨◯⟩—⟨◯⟩—CN | 3 |
| $n\text{-}C_4H_9$—⟨H⟩—⟨◯⟩—CN | 20 |
| $n\text{-}C_3H_7$—⟨◯⟩—COO—⟨◯⟩—$C_5H_{11}$—n | 40 |
| $n\text{-}C_3H_7$—⟨H⟩—COO—⟨◯⟩—⟨◯⟩—$C_5H_{11}$—n | 11 |
| $C_2H_5$—⟨H⟩—COO—⟨◯⟩—⟨◯⟩—CN | 11 |

12. A composition as claimed in claim 1 and which comprises the following stated components in stated percentage by weight or percentages which differ therefrom by not more than 10% of the composition:

| Component | Percentage by weight |
|---|---|
| $C_2H_5$—⟨◯⟩—⟨◯⟩—CN | 15 |
| $n\text{-}C_4H_9$—⟨H⟩—⟨◯⟩—CN | 15 |
| $n\text{-}C_3H_7$—⟨◯⟩—COO—⟨◯⟩—$C_5H_{11}$—n | 40 |
| $C_2H_5$—⟨H⟩—COO—⟨◯⟩—⟨◯⟩—CN | 15 |
| $n\text{-}C_5H_{11}$—⟨H⟩—⟨◯⟩—⟨◯⟩—CN | 15 |

13. A composition as claimed in claim 1 and which comprises the following stated components in the stated percentage by weight or percentages which differ therefrom by not more than 10% of the composition:

| Component | Percentage by weight |
|---|---|
| $C_2H_5$—⟨◯⟩—⟨◯⟩—CN | 15 |
| $n\text{-}C_4H_9$—⟨◯⟩—⟨◯⟩—CN | 3 |
| $n\text{-}C_4H_9$—⟨H⟩—⟨◯⟩—CN | 20 |
| $n\text{-}C_3H_7$—⟨◯⟩—COO—⟨◯⟩—$C_5H_{11}$—n | 30 |
| $n\text{-}C_5H_{11}$—⟨H⟩—⟨◯⟩—⟨◯⟩—CN | 16 |
| $C_2H_5$—⟨H⟩—COO—⟨◯⟩—⟨◯⟩—CN | 16 |

14. A composition as claimed in claim 1 and which comprises the following stated components in the stated percentage by weight or percentages which differ therefrom by not more than 10% of the composition:

| Component | Percentage by weight |
|---|---|
| C₂H₅—⟨◯⟩—⟨◯⟩—CN | 15 |
| n-C₄H₉—⟨H⟩—⟨◯⟩—CN | 20 |
| n-C₃H₇—⟨◯⟩—COO—⟨◯⟩—C₅H₁₁-n | 20 |
| n-C₃H₇—⟨H⟩—COO—⟨◯⟩—⟨◯⟩—C₅H₁₁-n | 20 |
| C₂H₅—⟨H⟩—CO.O—⟨◯⟩—⟨◯⟩—CN | 10 |
| n-C₄H₉—⟨◯⟩—⟨◯⟩—CN | 15 |

15. A composition as claimed in claim 1 and which comprises the following stated components in the stated percentage by weight or percentages which differ therefrom by not more than 10% of the composition:

| Component | Percentage by weight |
|---|---|
| C₂H₅—⟨◯⟩—⟨◯⟩—CN | 15 |
| n-C₄H₉—⟨H⟩—⟨◯⟩—CN | 15 |
| n-C₃H₇—⟨◯⟩—COO—⟨◯⟩—C₃H₇-n | 40 |
| n-C₅H₁₁—⟨H⟩—⟨◯⟩—⟨◯⟩—CN | 15 |
| C₂H₅—⟨H⟩—COO—⟨◯⟩—⟨◯⟩—CN | 15 |

16. A composition as claimed in claim 1 and which comprises the following stated components in the stated percentage by weight or percentages which differ therefrom by not more than 10% of the composition:

| Component | Percentage by weight |
|---|---|
| C₂H₅—⟨◯⟩—⟨◯⟩—CN | 15 |
| n-C₄H₉—⟨◯⟩—⟨◯⟩—CN | 6 |
| n-C₃H₇—⟨H⟩—⟨◯⟩—CN | 23 |
| n-C₃H₇—⟨◯⟩—COO—⟨◯⟩—C₃H₇-n | 30 |
| n-C₅H₁₁—⟨H⟩—⟨◯⟩—⟨◯⟩—CN | 13 |
| C₂H₅—⟨H⟩—COO—⟨◯⟩—⟨◯⟩—CN | 13 |

17. A multiplexed twisted nematic liquid crystal electro-optical display which includes two dielectric substrates at least one of which is transparent, a film of liquid crystal material sandwiched between the substrates, the molecular arrangement in the material being such as to give the twisted nematic effect, and electrodes on the inner surfaces of the substrates for applying electric fields across the liquid crystal material, the electrodes being in a configuration whereby the electric fields are applicable in a multiplexed fashion, wherein the improvement comprises the liquid crystal material being the composition claimed in claim 1.

* * * * *